Patented Jan. 15, 1952

2,582,730

UNITED STATES PATENT OFFICE 2,582,730

MODIFIED AMINOPLAST COMPOSITIONS AND PRODUCTS

Henry P. Wohnsiedler, Darien, and Edward L. Kropa, Old Greenwich, Conn., assignors to American Cyanamid Company, New York, N. Y., a corporation of Maine No Drawing. Application November 25, 1950, Serial No. 197,641

18 Claims. (Cl. 154—43)

This invention relates to new and useful compositions having properties that render them particularly useful in the plastics, coating, laminating and other arts, and to products prepared therefrom. More particularly, the invention is concerned with compositions of matter comprising (1) a product of reaction of ingredients comprising (a) an aldehyde, e. g., formaldehyde, furfural, etc., and (b) a monomeric amidogen compound containing not less than two amidogen groupings, each having at least one hydrogen atom attached to the amidogen nitrogen atom, and (2) at least one substance of the class consisting of polyethylene melamines (e. g., diethylene melamine, triethylene melamine and mixtures thereof), alcohol-reaction products of a polyethylene melamine and amine-reaction products of a polyethylene melamine. The ingredients of (1) and (2) may be used in various proportions but advantageously are employed in a weight ratio of 25 to 97% of the former to from 3 to 75% of the latter. Preferably the ingredient of (2) constitutes at least about 5% and not more than about 50 or 60% by weight of the total of (1) and (2).

From the preceding paragraph it will be seen that the present invention is concerned with compositions of matter and products comprising a modified aminoplast, specifically a modified, heat-curable (thermosetting) or a heat-cured (thermoset) resinous or other product of reaction of the ingredients described under (a) and (b) above, which aminoplast has been modified with a polyethylene melamine, or with an alcohol- or an amine-reaction product of a polyethylene melamine, or with a mixture of two or more such substances. The scope of the invention also includes products prepared from such compositions, e. g., molded articles of any desired shape or size, as well as laminated articles comprising superimposed sheets of fibrous material impregnated and bonded together with a modified aminoplast of the kind briefly described above.

As is well known, aminoplasts are synthetic resins derived from amino (including imino) or amido (including imido) compounds, a typical example being urea-formaldehyde resin [Reference: Modern Plastics, 17, 2, 433 (1939)]. The present invention is concerned particularly with the modification of aminoplasts which are products of reaction of ingredients comprising an aldehyde, e. g., formaldehyde, and a monomeric amidogen compound containing not less than two (e. g., two, three, four or any number, but preferably only two or three) amidogen groupings, each having at least one hydrogen atom (preferably two hydrogen atoms) attached to the amidogen nitrogen atom. "Amidogen compound," as used herein, has reference to an amino or an amido compound, and more particularly to such a compound (unless stated otherwise) which contains not less than two amidogen (amino or amido) groupings, each having at least one hydrogen atom attached to the amidogen nitrogen atom. Urea and melamine are typical examples of amidogen compounds.

In the commercial utilization of aminoplasts in the plastics, coating and laminating arts, it is frequently necessary to modify the heat-curable (heat-convertible) or potentially heat-curable aminoplast by incorporating therein a modifying agent which will improve the useful properties of the aminoplast. In some cases this modifier is a plasticizer or softener which will so improve the aminoplast that it will flow properly in the particular coating or laminating composition or, in the case of thermosetting aminoplast molding compositions, will show good plastic flow characteristics during molding. For example, if improper or insufficient plastic flow occurs during the molding operation, the molded articles may show streaked or wavy surfaces. Furthermore, if the plasticity of the molding composition is not sufficient, lack of physical homogeneity as the result of incompletely knitted granules often characterizes the moldings, especially massive moldings. In other instances, the modifier is a substance which will toughen molded articles produced from the modified aminoplast, whereby molded pieces are obtained which show better strength characteristics than those produced from unmodified aminoplasts.

In filled (e. g., cellulose-filled) molding compositions, it is also important that any plasticizer employed be compatible with both the cellulose and the aminoplast, e. g., a melamine-formaldehyde resin, so as to obtain molded articles having optimum dimensional stability and resistance to cracking around inserts. With both unfilled and filled aminoplast compositions, it is also desirable that the molded piece show minimum shrinkage of the initially molded article with respect to the cold dimension of the mold, which shrinkage is commonly referred to as "cold mold to cold piece shrinkage." Another desirable property of both unfilled and filled aminoplast compositions is that they show minimum shrinkage on aging.

In impregnating, coating and laminating compositions wherein the aminoplast is utilized in the form of a solution thereof, it is also important that the modifier (e. g., a plasticizer, a toughening agent, etc.) for the aminoplast be soluble in the same solvent in which the aminoplast is dissolved, and for economic reasons it is also desirable that this solvent be relatively inexpensive.

In the production of, for example, laminated structures, e. g., paper- and canvas-filled laminates, it is also important that the aminoplast binder impart optimum flexural-strength characteristics to the laminate, and that it be possible to subject the laminated article to sawing, punching, drilling and other fabrication operations without cracking, chipping, breaking or other damage thereto. These properties and, in some cases, workability are also desirable in molded aminoplast articles wherein the filler is of the finely divided type, i. e., finely divided alpha-cellulose. It is apparent, therefore, that in many instances it is desirable that the modifier of the aminoplast be able to toughen the cured aminoplast so that it will be able effectively to withstand sudden shocks and strains. In numerous cases such a toughening agent advantageously is one which also imparts plasticizing or softening action to the heat-curable aminoplast as it assumes its ultimate form or shape. Generally, plasticizers and toughening agents perform several functions in a molding composition. The lower-molecular-weight substances generally promote flow and increase the plasticity of the product whereas the higher-molecular-weight components act as toughening agents.

From the foregoing, it will be seen that in the utilization of modified aminoplasts (e. g., modified resinous reaction products of formaldehyde or other aldehyde with urea, thiourea, iminourea (guanidine), dicyandiamide, guanylurea, biguanide, melamine, guanylmelamine, mixtures thereof in any proportions, etc.), in molding, impregnating, coating, laminating, casting and other applications, it is important that the modifier, e. g., a plasticiser and/or toughening agent, have certain characteristics. The particular characteristics or combination of characteristics desired in the modifier obviously will vary to some extent depending upon the particular service application of the modified aminoplast. Some of these characteristics, more particularly the necessary requisites of a plasticiser for an aminoplast, are described more fully in the copending application of Henry P. Wohnsiedler, Edward L. Kropa, and Walter M. Thomas, Serial No. 21,856, filed April 19, 1948.

The present invention is based on our discovery that polyethylene melamines (diethylene melamine, triethylene melamine or a mixture of di- and triethylene melamines in any proportions), as well as certain reaction products thereof (e. g., alcohol- and amine-reaction products of a polyethylene melamine), constitute a class of materials that are particularly adapted for use as modifiers of aminoplasts obtained by reaction of ingredients comprising an aldehyde, e. g., formaldehyde, and a monomeric amidogen compound containing not less than two amidogen groupings each having at least one hydrogen atom (preferably two hydrogen atoms) attached to the amidogen nitrogen atom. More particularly, we have discovered that such modifiers have the peculiar and distinctive property of reducing the shrinkage (especially the "after-shrinkage") of molded articles produced from aminoplasts into which such modifiers have been incorporated. This was quite unexpected and unpredictable. We are unable to explain with certainty why polyethylene melamines and certain reaction products thereof have this unusual property when incorporated into an aminoplast composition, but a possible explanation is the following:

Polyethylene melamines theoretically are capable of combining with water, and it is because of this theoretical possibility that the improvement in shrinkage characteristics may be due. Since the "after-shrinkage" or aging-shrinkage of molded articles produced from aminoplast molding compounds is directly traceable to the confined moisture and its gradual diffusion out of the structure, it is quite likely that polyethylene melamines and certain reaction products thereof function to "fix" this free moisture through chemical combination and thereby serve to control or limit the shrinkage of the molded article both initially and upon aging, e. g., either at normal temperature or at an elevated temperature.

It is quite likely that the modifiers used in practicing the present invention co-react with the amidogen-aldehyde aminoplast, with the result that the modified aminoplasts are different in kind (as evidenced by their differences in properties, from the modifier and the amidogen-aldehyde aminoplast which are combined to produce the new compositions and products of the present invention.

Triethylene melamine is a known compound and can be prepared, for example, by the method described in Wystrach and Kaiser Patent No. 2,520,619. The formula for triethylene melamine is

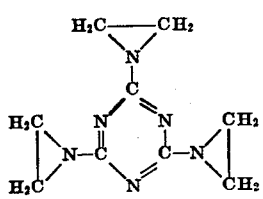

while the formula for diethylene melamine is

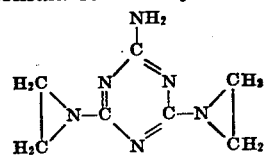

Diethylene melamine can be prepared, for instance, as described in the copending application of Frederic Schafer, Serial No. 165,861, filed June 2, 1950. These polyethylene melamines may be described as being s-triazine (1,3,5-triazine) derivatives wherein at least two of the amino nitrogen atoms of a polyamino-s-triazine each has one ethylene group attached thereto instead of the two hydrogen atoms.

In our copending application Serial No. 197,637, filed concurrently herewith, we have disclosed and claimed compositions comprising the product of reaction of ingredients comprising (1) a polyethylene melamine and (2) a different nitrogenous compound containing a radical represented by the formula

where R represents a member of the class consisting of hydrogen and hydroxyhydrocarbon radicals and R' represents a member of the class consisting of hydrogen, hydrocarbon radicals and hydroxyhydrocarbon radicals. Such reaction products can be used as modifiers in producing the modified aminoplasts of the present invention. Examples of such substances are reaction products of ingredients comprising either diethylene melamine, triethylene melamine or a mixture of diethylene melamine and triethylene melamine in any proportions with butyl amine, amyl amine, octyl amine, 1,4-diaminobutane, diethylene triamine, tetraethylene pentamine, ethanolamine, diethanolamine, triethanolamine, aniline, 4-amino-2-butanol, 1-methylamino-2-propanol or any of the other compounds containing a radical represented by the aforementioned general formula that are given by way of illustration in our aforesaid copending application Serial No. 197,637.

To the best of our knowledge and belief, any monohydric or polyhydric alcohol can be used as a reactant with a polyethylene melamine (or mixture of polyethylene melamines) to form a reaction product that can be used as a modifier in producing the modified aminoplasts of the present invention. Numerous examples of such reaction products are given in our copending application Serial No. 197,638, also filed concurrently herewith. In that application we have disclosed and claimed compositions comprising the product of reaction of ingredients comprising (1) a polyethylene melamine and (2) a non-nitrogenous, hydroxy compound which contains carbon having bonded directly thereto at least one and not more than six hydroxy groups per molecule, for instance methanol, ethanol, propanol, the glycols (e. g., ethylene glycol, diethylene glycol, triethylene glycol, etc.), glycerol, pentaerythritol, sorbitol, mannitol, ethylene glycol monoethyl ether, phenol, resorcinol, etc., or mixtures thereof, e. g., a mixture of a monohydric alcohol and a polyhydric alcohol containing not more than six alcoholic hydroxyl groups, a mixture of a phenol (e. g., phenol itself, o-, m- or p-cresol or mixtures thereof, a xylenol, an ethylphenol, etc.) and a monohydric alcohol and/or a polyhydric alcohol containing not more than six alcoholic hydroxyl groups, as well as other mixtures of hydroxy compounds of the kind aforementioned.

Reaction products of the kind disclosed in our aforesaid application Serial No. 197,638, as well as others, can be used as modifiers in producing the modified aminoplasts of the present invention. It is to be distinctly understood, however, that in carrying the instant invention into effect we are not limited only to the use of reaction products of a polyethylene melamine and an alcohol containing not more than six alcoholic hydroxyl groups, since we can use such reaction products made from alcohols containing any number of alcoholic hydroxyl groups, e. g., seven, eight, nine, ten, twelve, fifteen, twenty or any higher number, including polyvinyl alcohol, polyallyl alcohol containing an average of, for instance, from four to twelve or more alcoholic hydroxyl groups, etc.

Illustrative examples of amidogen-aldeyde aminoplasts which can be modified with a polyethylene melamine, or with an alcohol- or an amine-reaction product of a polyethylene melamine, or with a mixture of any two or of all of such substances, are aminotriazine-aldehyde resins (e. g., melamine-formaldehyde resins), urea-aldehyde resins (e. g., urea-formaldehyde resins), thiourea-aldehyde resins (e. g., thiourea-aldehyde resins (e. g., thiourea-formaldehyde resins), urea-aminotriazine-aldehyde resins (e. g., urea-melamine-formaldehyde resins), aminodiazine-aldehyde resins (e. g., aminodiazine formaldehyde resins), protein-aldehyde resins (e. g., casein-formaldehyde resins), resinous condensation products of an aldehyde, e. g., formaldehyde, with a polyamide of a polycarboxylic acid, e. g., malonic diamide, succinic diamide, fumaric diamide, itaconic diamide, phthalic diamide, citric triamide, etc.

The amount of the modifier of the kind used in practicing the present invention and which is incorporated into the amidogen-aldehyde aminoplast to obtain a modified aminoplast composition having improved useful properties, e. g., improved shrinkage resistance, may be widely varied as desired or as conditions may require. In some cases, only a relatively small amount may be required, e. g., about 3 or 4% by weight of the combined amount of modifier and aminoplast. Ordinarily, however, the modifier constitutes, by weight, from about 5% to about 75%, and more specifically from about 5% to about 50 or 60%, of the combined amount of modifier and aminoplast. Thus, depending upon the particular service application of the modified aminoplast, the modifier may constitute from 5-10% to 30-40% by weight of the combined weight of modifier and aminoplast.

Any suitable means can be employed for incorporating the modifier into the amidogen-aldehyde aminoplast. For example, a modified aminoplast can be prepared by first mixing together the amidogen compound, aldehyde and modifier used in practicing the present invention (e. g., diethylene melamine, triethylene melamine, or a mixture thereof; or an alcohol- or an amine-reaction product of diethylene melamine, triethylene melamine or a mixture thereof; or a mixture of any two or all of such modifiers). Thereafter simultaneous reaction is effected between the reactive ingredients of the mixture in the presence or absence of other addition agents, for instance condensation catalysts, fillers, other natural or synthetic resinous materials, solvents, diluents, etc. Such a reaction can be effected under alkaline, neutral or acid conditions and under a variety of time, temperature and pressure conditions. The temperature of the reaction may vary from room temperature, in certain cases, to the reflux temperature of the reactants at reduced, atmospheric or superatmospheric pressure. The reactants may be dissolved or dispersed in a suitable liquid medium, if desired, during the reaction.

Alternatively, the modifier used in practicing our invention can be incorporated, if desired, into the heat-curable amidogen-aldehyde aminoplast at any suitable stage of the manufacture of a molding, coating, impregnating, laminating or other composition therefrom. For example, the modifier may be dry- or wet-blended with the amidogen-aldehyde resin (e. g., a melamine-formaldehyde resin, etc.), a filler (e. g., alpha-cellulose, wood flour, etc.), a mold lubricant (e. g. zinc stearate, etc.), and, if desired, a curing catalyst (e. g., phthalic anhydride, tetrachlorophthalic anhydride, ammonium chloride, oxalic acid, acetic acid, phosphoric acid, diammonium phthalate, diammonium hydrogen phosphate, diammonium ethyl phosphate, ammonium silicofluoride, a melamine fluosilicate, a melamine fluoborate, melamine pyrophosphate, chloroacetamide, succinic acid, etc.). Thereafter the mixture is worked on hot rolls to cause the modifier to become homogeneously incorporated (as by chemical combination) with the amidogen-aldehyde aminoplast or with a component thereof (e. g., water or other hydroxy compound). During such working, the cure of the heat-curable or potentially heat-curable composition is advanced to a desired stage. The resulting sheet is then broken and ground to produce a molding composition. If necessary, the homogeneous (substantially homogeneous) molding compound may be heated further prior to molding in order to advance the reaction still further and to stiffen the flow of the compound during molding.

Liquid compositions can be produced, for instance, merely by dissolving the amidogen-aldehyde aminoplast and the modifier in a suitable mutual solvent. For example, in the case of water-soluble, alcohol-soluble or water- and alcohol-soluble urea-formaldehyde, melamine-formaldehyde, urea-melamine-formaldehyde resins, and the like, the liquid composition can be prepared merely by admixing with such a solution a modifier (or modifiers) of the kind used in practicing the present invention and which also is soluble in the same solvent or mixture of solvents, or which can be made soluble therein by the addition of another solvent.

In order that those skilled in the art better may understand how the present invention can be carried into effect, the following examples are given by way of illustration and not by way of limitation. All parts and percentages are by weight.

EXAMPLE 1

|  | Parts |
|---|---|
| Melamine-formaldehyde resin[1] | 190.0 |
| Triethylene melamine | 10.0 |
| Zinc stearate | 0.4 |

[1] NOTE.—Resinous reaction product of melamine and formaldehyde in a molar ratio of approximately 2 moles of HCHO per mole of melamine. This resin advantageously can be prepared by the process disclosed in Wohnsiedler and Thomas copending application Serial No. 675,296, filed June 7, 1946, now Patent No. 2,563,630 dated August 7, 1951. The cure of the resin was advanced by heating in a 110° C. oven for 2¼ hours prior to passage through an Abbé cutter provided with a 1/16-inch screen, followed by further drying at from 70° to 150° C. prior to use in the above formulation.

The above ingredients were ball-milled together for about 60 hours, screened through a 60-mesh screen and then stored in a closed container until portions thereof were molded. A well-molded disc, 3 inches in diameter, was produced by molding a sample of the composition for 20 minutes at 155° C. under a pressure of 3000 pounds per square inch. The molded disc had a good surface appearance and showed good plastic flow during molding.

A control sample produced by similarly ball-milling a mixture of 200 parts of the same melamine-formaldehyde resin and 0.4 part of zinc stearate was molded in exactly the same manner as the melamine-formaldehyde resin which had been modified with triethylene melamine. The shrinkage data on the unmodified and modified melamine-formaldehyde resins are shown below:

|  | Cold Mold to Cold Piece Shrinkage[1] | [2] Shrinkage on Aging at 220° F. for— | | |
|---|---|---|---|---|
|  |  | 2 days | 1 week | 2 weeks |
| Unmodified resin | 7.9 | 4.6 | 8.6 | 11.9 |
| Modified resin | 7.7 | 3.4 | 5.9 | 8.4 |

NOTES:
[1] Shrinkage in mills per inch of the initially molded piece with respect to the cold dimension of the mold.
[2] Additional shrinkage of the molded piece after aging by heating at 220° F. for the specified periods.

EXAMPLE 2

|  | Parts |
|---|---|
| Melamine-formaldehyde resin | 270.0 |
| Triethylene melamine | 30.0 |
| Zinc stearate | 0.6 |
| Magnesium oxide | 0.3 |

The melamine-formaldehyde resin used in this example was the same as that employed in Example 1. A molding composition was prepared from a mixture of the above ingredients likewise as described in Example 1. A sample of the molding compound was molded into the form of a disc, 3 inches in diameter, by molding for 30 minutes at 155° C. under a pressure of 3,000 lbs. per square inch. A control sample (same as the other sample with the exception that it contained no triethylene melamine) was prepared and molded in a similar manner with the exception that the time of molding was 20 minutes instead of 30 minutes. The shrinkage data on the unmodified and modified melamine-formaldehyde resins are shown below:

|  | Cold Mold to Cold Piece Shrinkage | Shrinkage on Aging at 220° F. for— | | |
|---|---|---|---|---|
|  |  | 2 days | 1 week | 2 weeks |
| Unmodified resin | 7.9 | 5.0 | 9.3 | 12.5 |
| Modified resin | 7.7 | 3.7 | 6.6 | 8.4 |

EXAMPLE 3

A

This example illustrates the modification of a cellulose-filled melamine-formaldehyde resin with triethylene melamine.

|  | Parts |
|---|---|
| Cellulose-filled melamine-formaldehyde resin[1] | 750.0 |
| Triethylene melamine | 18.7 |
| Phthalic anhydride | 0.41 |
| Zinc stearate | 8.25 |

[1] NOTE.—This filled resin contained approximately 35 parts of alpha-cellulose and 65 parts of a resinous reaction product of formaldehyde and melamine in the ratio of approximately 3 moles of the former to 1 mole of the latter.

All of the above ingredients with the exception of 3.3 parts of zinc stearate were ball-milled together for a total of 18 hours, the remainder (3.3 parts) of zinc stearate being added one hour before the end of the grinding period, and ball-milling then was continued to form a homogeneous composition.

B

Another composition was prepared in exactly the same manner described under A of this example with the exception that there was used 37.5 parts of triethylene melamine instead of 18.7 parts.

C

A control sample was prepared in exactly the same manner described above with reference to the compositions of A and B except that no triethylene melamine was incorporated in the composition. Samples A, B and C were molded in the same manner described under Example 1. The molded pieces had a good appearance, the molded article produced from the B composition being a somewhat deeper yellow than that of A composition. The shrinkage data on aging the unmodified and triethylene melamine-modified compositions for 2 days at 220° F. are shown below:

| | Shrinkage on aging at 220° F. for 2 days |
|---|---|
| Unmodified composition of C | 4.5 |
| Modified composition of A | 3.33 |
| Modified composition of B | 2.2 |

EXAMPLE 4

A

A melamine-formaldehyde resin produced in essentially the same manner described under Example 1 (142.5 parts) and 0.4 part of zinc stearate were ground together in a ball-mill for approximately 16 hours, after which the ground composition was dried in an oven at 65° C. for 1 hour prior to use as a molding compound.

B

| | Parts |
|---|---|
| Same melamine-formaldehyde resin as was used in A | 142.5 |
| Reaction product of triethylene melamine and methyl alcohol[1] | 25.0 |

[1] Note.—The triethylene melamine-methyl alcohol reaction product was prepared by heating together 100 parts of triethylene melamine and 317 parts of methyl alcohol under reflux at a temperature of 67°–68° C. for 2 hours and 33 minutes. The resulting composition contained about 30% of solid reaction product.

The above ingredients were mixed together until a uniform blend had been obtained, after which the mixture was allowed to stand in the air until dry. The air-dried blend (167.5 parts) and 0.5 part of zinc stearate were ground together in a ball-mill for approximately 16 hours, after which the ground material was dried in an oven at 65° C. for 1 hour prior to use as a molding composition.

C

Exactly the same procedure was followed as described under B with the exception that the blend was formed of 135.0 parts of the melamine-formaldehyde resin and 50.1 parts of the triethylene melamine-methyl alcohol reaction product. The air-dried blend (185.1 parts) was ground with 0.5 part of zinc stearate in the same manner described under B, and thereafter oven-dried also in the same manner as was set forth under B.

Samples of A, B and C were molded into the form of 3-inch discs in essentially the same manner described in Example 1. The control sample (A) showed a cold mold to cold piece shrinkage of 8.3 mils per inch whereas the corresponding values for the molded pieces of B and C were 7.7 and 7.2 mils, respectively. When each of the molded pieces was heated for 48 hours at 220° F. the molded control sample cracked badly whereas no cracking whatsoever was noted on either of the molded pieces of B or C.

EXAMPLE 5

The formulation and procedure are exactly the same as described under Example 1 with the exception that 10 parts of diethylene melamine instead of 10 parts of triethylene melamine are used. Improvements in cold mold to cold piece shrinkage and in shrinkage on aging similar to those described under Example 1 are obtained on molded pieces of the diethylene melamine-modified melamine-formaldehyde resin as compared with the unmodified resin.

EXAMPLE 6

Same as in Example 1 with the exception that 190 parts of a urea-formaldehyde resin produced by reaction of about 1.5 moles of formaldehyde per mole of urea are used in place of 190 parts of melamine-formaldehyde resin. Similar results are obtained.

EXAMPLE 7

| | Parts |
|---|---|
| Melamine-formaldehyde resin[1] | 90.0 |
| Triethylene melamine-methyl alcohol reaction product (same as was used in Example 4) | 33.4 |
| Zinc stearate | 0.9 |
| Magnesium oxide | 0.45 |

[1] Note.—Produced by reaction of formaldehyde and melamine in the ratio of approximately 2 moles of the former to 1 mole of the latter, and advancing the cure by working on hot rolls.

The above ingredients were mixed together without any evidence of stickiness, after which the mixture was transferred to a tray and air-dried prior to ball-milling for about 16 hours. The ground blend was then oven-dried for about one hour at 65° C.

Samples of the molding composition produced as above described were molded under heat and pressure in the same manner as described under Example 1, as were also samples of a molding composition which had been prepared in a similar manner with the exception that the reaction product of triethylene melamine and methyl alcohol was omitted from the formulation. Both the unmodified and modified melamine-formaldehyde molding compositions yielded well-cured molded pieces. The unmodified resin produced a molded article which showed a cold mold to cold piece shrinkage of 8.5 mils per inch. In marked contrast, the cold mold to cold piece shrinkage of the molded article produced from the modified melamine-formaldehyde resin was only 4.8 mils per inch.

EXAMPLE 8

A

| | Parts |
|---|---|
| Melamine-formaldehyde resin (2:1 ratio of formaldehyde to melamine) | 246 |
| Water | 82 |
| Ethyl alcohol | 82 |
| Ethylene glycol monomethyl ether | 82 | were mixed together to yield a solution containing approximately 50% of resin solids.

B

A reaction product of ingredients comprising triethylene melamine and n-butyl amine was prepared as follows:

| | Parts |
|---|---|
| Triethylene melamine | 75.0 |
| n-Butyl amine | 26.8 |
| Ethyl alcohol | 302.5 |

The above ingredients were heated together to an initial reflux temperature of 77° C. over a period of 7 minutes, and then under vigorous reflux at 81° C. for an additional 36 minutes. After only 23 minutes of vigorous refluxing, a sample taken from the reaction mass was clear when cool. The reaction product was mixed with a small amount of diatomaceous earth, pressure-filtered and the clarified liquid then used as a modifier of the solution of A.

C

| | Parts |
|---|---|
| Solution of A | 75 |
| Reaction product of B | 75 | were thoroughly mixed together to form a laminating composition. Laminated articles were prepared by impregnating sheets of paper by immersion in this composition, drying the impregnated sheets horizontally on a frame in a drier, superimposing 8 sheets of the dried, impregnated paper, and then laminating the assembled sheets by compressing for 30 minutes at 155° C. under a pressure of about 1000 pounds per square inch. In one case the sheets of wet, impregnated paper were dried for 15 minutes at 50° C., yielding dried sheets containing approximately 37% by weight of resin. In another case the wet, initially impregnated sheets were dried for 15 minutes at 50° C., immersed again in the laminating composition, and re-dried for 30 minutes at 50° C. The dried sheets contained about 44% by weight of resin. In both instances strong, translucent, well-bonded laminated articles having fair flexibility were obtained.

Similar results are obtained when the reaction product of B is one produced by reaction of 75.0 parts of triethylene melamine and 26.8 parts of n-butyl amine in the absence of the ethyl alcohol, and, at the end of the reaction period, adding 302.5 parts of ethyl alcohol to the triethylene melamine-n-butyl amine reaction product.

EXAMPLE 9

| | Parts |
|---|---|
| Solution of A of Example 8 | 120 |
| Reaction product of B of Example 8 | 240 |
| Water | 209 | were mixed together to form a laminating composition. Sheets of paper were immersed three times in this composition, being dried for 30 minutes at 50° C. after each immersion. Fourteen (14) sheets of the dried, impregnated paper were assembled and laminated together by heating for 30 minutes at 155° C. under a pressure of 1000 pounds per square inch, yielding a rigid, well-bonded laminate.

EXAMPLE 10

A

| | Parts |
|---|---|
| Melamine-formaldehyde resin (same as in A of Example 8) | 250 |
| Water | 125 |
| Ethyl alcohol | 125 | were mixed together to yield a solution containing approximately 50% of resin solids.

B

A reaction product of ingredients comprising triethylene melamine and ethanolamine (monoethanolamine) was prepared as follows:

| | Parts | Approx. Molar Ratio |
|---|---|---|
| Triethylene melamine | 90 | 1 |
| Ethanolamine | 27 | 1 |
| Ethanol (ethyl alcohol) | 217 | | were heated together, with stirring, in a reaction vessel fitted with a reflux condenser and placed in an oil bath. The temperature of the mass was brought to 66° C. in 5 minutes. After heating to 74° C. in an additional minute, the solids had completely dissolved. Refluxing began a minute later at 81° C., and was caused to continue for a total of 8 minutes. The solution comprising the reaction product was cooled to 28° C., a small amount of insoluble matter being present in the cooled solution. A sample of the solution was dried to yield a clear, balsam-like material, which became a fairly hard resin after drying for about 16 hours. Filtration of the bulk of the liquid product gave a clear, water-white solution which tolerated 5 parts of water per 1 part of the solution without clouding.

C

| | Parts |
|---|---|
| Solution of A | 240 |
| Reaction product of B | 171 | were thoroughly mixed together to form a laminating composition. Sheets of paper were twice immersed in this composition, being dried for 30 minutes at 50° C. after each immersion. The final, dried sheets contained about 59% by weight of resin. Fourteen (14) sheets of the dried, impregnated paper were assembled and laminated together as described under Example 9. A strong, translucent, well-bonded laminated article was obtained.

EXAMPLE 11

A

Same as in A of Example 10.

B

A reaction product of ingredients comprising triethylene melamine and pentaerythritol was prepared as follows:

| | Parts | Approx. Mol r Ratio |
|---|---|---|
| Triethylene melamine | 90 | 2 |
| Pentaerythritol | 30 | 1 |
| Ethyl alcohol | 360 | 26 |
| 0.5 N aqueous sodium hydroxide solution (catalyst) | 12 | |

A mixture of the above ingredients was heated with stirring in a reaction vessel provided with a stirrer and a reflux condenser, being brought to reflux temperature (80°–82° C.) in 17 minutes and thereafter vigorously refluxed for 1 hour and 33 minutes. The solution comprising the reaction product was pressure-filtered to yield a clear solution.

C

| | Parts |
|---|---|
| Solution of A | 125 |
| Reaction product of B | 125 | were thoroughly mixed together to form a laminating composition. Sheets of paper were twice immersed in this composition, being dried for 30 minutes at 50° C. after the first immersion, and for 45 minutes at this same temperature after the second immersion. Sixteen (16) sheets of the dried, impregnated paper were bonded together to form a laminated article by heating for 30 minutes at about 155° C. under a pressure of approximately 1000 pounds per square inch. A translucent, strong, rigid, well-bonded laminate was obtained.

EXAMPLE 12

This example illustrates the modification of a cellulose-filled urea-formaldehyde resin with triethylene melamine.

A

| | Parts |
|---|---|
| Cellulose-filled urea-formaldehyde resin [1] | 750.0 |
| Triethylene melamine | 18.7 |
| Phthalic anhydride | 1.16 |
| Zinc stearate | 3.75 |

[1] NOTE.—This filled resin contained approximately 35 parts of alpha-cellulose and 65 parts of a resinous reaction product of formaldehyde and urea in the ratio of approximately 1.5 moles of the former to 1 mole of the latter.

All of the above ingredients with the exception of 1.5 parts of zinc stearate were ball-milled together for a total of 18 hours, the remainder (1.5 parts) of zinc stearate being added one hour before the end of the grinding period, and ball-milling then was continued to form a homogeneous composition.

B

Another composition was prepared in exactly the same manner described under A of this example with the exception that there was used 37.5 parts of triethylene melamine instead of 18.7 parts.

C

A control sample was prepared in exactly the same manner described above with reference to the compositions of A and B with the exception that no triethylene melamine was incorporated in the composition. Samples of A, B and C were molded in the same manner described under Example 1. The molded pieces had a good appearance, the molded articles produced from the A and B compositions having a lower "after-shrinkage" (shrinkage on aging at 220° F. for 2 days and longer) than the control sample.

It will be understood, of course, by those skilled in the art that our invention is not limited to the specific compositions or to the particular procedures given in the above illustrative examples. Thus, instead of the particular modifiers employed in the examples we can use, depending, for instance, upon the particular amidogen-aldehyde reaction product which is being modified and the particular use intended for the modified product, any other polyethylene melamine (or mixture of polyethylene melamines), or any other reaction product of ingredients comprising an amine or an alcohol, or both an amine and an alcohol, and diethylene melamine, triethylene melamine or a mixture thereof in any proportions, or a mixture in any proportions of a polyethylene melamine and an amine- and/or an alcohol-reaction product of a polyethylene melamine, numerous examples of which modifiers have been given hereinbefore and in our aforementioned copending applications.

Our invention is operative with reaction products of an aldehyde, specifically formaldehyde, and any monomeric amidogen compound containing at least two aldehyde-reactable amino or amido or amino and amido groupings, that is to say, any monomeric amidogen compound containing at least two amidogen groupings, each having at least one hydrogen atom (preferably two hydrogen atoms) attached to the amidogen nitrogen atom.

As amidogen-aldehyde aminoplasts we prefer to use heat-curable or potentially heat-curable resinous reaction products of ingredients comprising a polyaminotriazine (e. g., melamine) and formaldehyde, or comprising urea, melamine (or other polyaminotriazine) and formaldehyde. However, heat-curable or potentially heat-curable urea-formaldehyde, thiourea-formaldehyde and thiourea-melamine-formaldehyde resinous reaction products also can be employed. Dimethylol urea, alkyl ethers thereof, polymethylol melamines (more particularly mono-, di-, tri-, tetra-, penta- and hexamethylol melamines) and alkyl ethers thereof can be used. Examples of other amidogen compounds that can be reacted with an aldehyde to provide the primary reaction product which is modified in accordance with the present invention are: methylurea, phenylurea, phenylthiourea, allylurea, guanylurea, guanylthiourea, dicyandiamide, guanidine, biguanide, diaminodiazines, guanazole and other diaminotriazoles, ammeline, ethylenediamine, etc. Any suitable aldehyde can be employed as a reactant with the amidogen compound in forming the aminoplast. We prefer to use formaldehyde, e. g., aqueous solutions of formaldehyde. Paraformaldehyde, hexamethylene tetramine, or other compounds engendering formaldehyde also can be used. In certain cases other aldehydes, e. g., acetaldehyde, propionaldehyde, butyraldehyde, furfural, acrolein, methacrolein, crotonaldehyde, octaldehyde, benzaldehyde, mixtures thereof, or mixtures of formaldehyde (or compounds engendering formaldehyde) with such other aldehyde or aldehydes, can be employed. The choice of the aldehyde is dependent upon such factors as, for instance, the particular properties desired in the finished product and economic considerations.

The amidogen-aldehyde aminoplasts are prepared, in general, in accordance with technique well known to the art. The molar ratio of aldehyde to amidogen compound, depending, for instance, upon the particular amidogen compound employed, may vary, for example, from 0.35 mole to 2.0 moles thereof for each aldehyde-reactable amidogen grouping in the amidogen compound.

Dyes, pigments and opacifiers may be incorporated into the compositions of this invention to alter the visual appearance and the optical properties of the finished product. If needed, mold lubricants may be added to facilitate molding of the heat-convertible (heat-hardenable) molding compositions. Fillers (e. g., alpha-cellulose, asbestos, mica, wood flour, etc.) may be incorporated to obtain a wide variety of molding compounds and molded articles adapted to meet particular conditions. Curing agents, examples of which have been given hereinbefore, also can be added. Other effect agents also may be incorporated as desired or as conditions may require.

Thermosetting (heat-hardenable) molding compositions comprising a heat-curable or potentially heat-curable amidogen-aldehyde aminoplast which has been modified, specifically plasticized and/or toughened and/or rendered shrinkage resistant either initially after withdrawal from the mold or after further aging, as herein described, can be molded into a variety of shapes under heat and pressure, more particularly at temperatures of the order of 100° to 200° C., preferably from approximately 120° or 130° to 170° or 180° C.

The modified amidogen-aldehyde aminoplasts of our invention are especially suitable for use in producing molded and laminated articles, for example, laminates comprising superimposed sheets of fibrous material such as paper, glass cloth, or cloth formed of silk, wool, cotton, rayons, etc., or cloths produced from synthetic fibers, e. g., fibers of nylon, polyacrylonitrile (or copolymers of acrylonitrile), vinyl chloride-acrylonitrile copolymers, vinyl chloride-vinylidene chloride copolymers, etc. In such structures the sheets are impregnated and bonded together with a thermoset product of reaction of ingredients comprising an aldehyde, specifically formaldehyde, and a monomeric amidogen compound of the kind aforementioned, which reaction product is modified with a modifier of the kind previously described.

Our modified amidogen-aldehyde aminoplasts are also useful in the treatment of paper or for incorporation therein during its formation, e. g., by addition to the beater prior to formation, in order to make a wet-strength paper. They are also useful as adhesives, as components of surface-protective compositions and for numerous other purposes. In the filled compositions the amount of filler (examples of which previously have been given) may be widely varied depending, for example, upon the particular filler employed and the intended use of the filled composition. Thus, the amount of filler may constitute, for instance, from a few per cent (e. g., from 2 to 5 or 10%) up to 50 or 60%, or even as much as 70 or 80% in some cases, by weight of the combined weight of filler and modified amidogen-aldehyde aminoplast.

We claim:

1. A composition of matter comprising (1) a product of reaction of ingredients comprising (a) an aldehyde and (b) a monomeric amidogen compound containing not less than two amidogen groupings each having at least one hydrogen atom attached to the amidogen nitrogen atom, and (2) at least one substance of the class consisting of polyethylene melamines, alcohol-reaction products of a polyethylene melamine and amine-reaction products of a polyethylene melamine, the ingredients of (1) and (2) being employed in a weight ratio of from 25 to 97 per cent of the former to from 3 to 75 per cent of the latter, and the aforementioned polyethylene melamine being a polyamino-s-triazine wherein at least two of the amino nitrogen atoms each has one ethylene group attached thereto instead of the two hydrogen atoms.

2. A composition as in claim 1 wherein the aldehyde of (a) is formaldehyde.

3. A composition as in claim 1 wherein the amidogen compound of (b) is urea.

4. A composition as in claim 1 wherein the amidogen compound of (b) is melamine.

5. A composition as in claim 1 wherein the substance of (2) is triethylene melamine, the formula for which is.

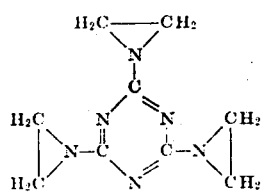

6. A composition as in claim 1 wherein the substance of (2) is a reaction product of a monohydric alcohol and triethylene melamine, the formula for which is.

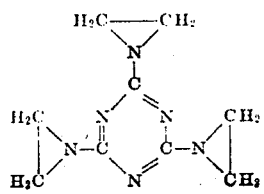

7. A composition as in claim 6 wherein the monohydric alcohol is methyl alcohol.

8. A composition as in claim 1 wherein the substance of (2) is a reaction product of a hydrocarbon amine and triethylene melamine, the formula for which is.

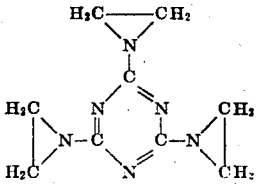

9. A composition as in claim 8 wherein the hydrocarbon amine is n-butyl amine.

10. A composition as in claim 1 wherein the substance of (2) is a reaction product of an alkanolamine and triethylene melamine, the formula for which is.

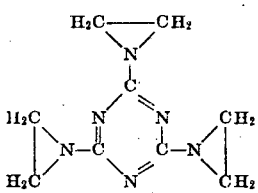

11. A composition as in claim 10 wherein the alkanolamine is monoethanolamine.

12. A heat-curable composition comprising (1) a heat-convertible product of reaction of ingredients comprising (a) formaldehyde and (b) a monomeric amidogen compound containing not less than two amidogen groupings each having two hydrogen atoms attached to the amidogen nitrogen atom and (2) at least one substance of the class consisting of polyethylene melamines, alcohol-reaction products of a polyethylene melamine and amine-reaction products of a polyethylene melamine, the ingredients of (1) and (2) being employed in a weight ratio of from 25 to 97 per cent of the former to from 3 to 75 per cent of the latter, and the aforementioned polyethylene melamine being a polyamino-s-triazine wherein at least two of the amino nitrogen atoms each has one ethylene group attached thereto instead of the two hydrogen atoms.

13. A product comprising the cured composition of claim 12.

14. A composition as in claim 12 wherein the amidogen compound of (b) is melamine.

15. A heat-hardenable molding composition comprising (1) a filler, (2) a heat-curable product of reaction of ingredients comprising (a) formaldehyde and (b) a monomeric amidogen compound containing not less than two amidogen groupings, each having two hydrogen atoms attached to the amidogen nitrogen atom, and (3) at least one substance of the class consisting of polyethylene melamines, alcohol-reaction products of a polyethylene melamine and amine-reaction products of a polyethylene melamine, the ingredients of (2) and (3) being employed in a weight ratio of from 50 to 95 per cent of the former to from 5 to 50 per cent of the latter, and the aforementioned polyethylene melamine being a polyamino-s-triazine wherein at least two of the amino nitrogen atoms each has one ethylene group attached thereto instead of the two hydrogen atoms.

16. An article of manufacture comprising the heat-hardened molding composition of claim 15.

17. A liquid composition comprising a solution containing (1) a soluble, thermosetting product of reaction of ingredients comprising (a) formaldehyde and (b) a monomeric amidogen compound containing not less than two amidogen groupings, each having two hydrogen atoms attached to the amidogen nitrogen atom, and (2) at least one substance of the class consisting of polyethylene melamines, alcohol-reaction products of a polyethylene melamine and amine-reaction products of a polyethylene melamine, the ingredients of (1) and (2) being employed in a weight ratio of from 50 to 95 per cent of the former to from 5 to 50 per cent of the latter, and the aforementioned polyethylene melamine being a polyamino-s-triazine wherein at least two of the amino nitrogen atoms each has one ethylene group attached thereto instead of the two hydrogen atoms.

18. A laminated article comprising superimposed sheets of fibrous material impregnated and bonded together with (1) a thermoset product of reaction of ingredients comprising (a) formaldehyde and (b) a monomeric amidogen compound containing not less than two amidogen groupings each having two hydrogen atoms attached to the amidogen nitrogen atom, and (2) at least one substance of the class consisting of polyethylene melamines, alcohol-reaction products of a polyethylene melamine and amine-reaction products of a polyethylene melamine, the ingredients of (1) and (2) being employed in a weight ratio of from 50 to 95 per cent of the former to from 5 to 50 per cent of the latter, and the aforementioned polyethylene melamine being a polyamino-s-triazine wherein at least two of the amino nitrogen atoms each has one ethylene group attached thereto instead of the two hydrogen atoms.

HENRY P. WOHNSIEDLER.
EDWARD L. KROPA.

REFERENCES CITED

The following references are of record in the file of this patent:

UNITED STATES PATENTS

| Number | Name | Date |
|---|---|---|
| 2,524,727 | Dudley | Oct. 3, 1950 |